United States Patent
Horikoshi (10) Patent No.: US 8,351,719 B2
(45) Date of Patent: Jan. 8, 2013

(54) IMAGE DECODING APPARATUS, IMAGE DECODING METHOD, AND PRINTING APPARATUS

(75) Inventor: Hiroki Horikoshi, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 889 days.

(21) Appl. No.: 12/188,371

(22) Filed: Aug. 8, 2008

(65) Prior Publication Data

US 2009/0060357 A1    Mar. 5, 2009

(30) Foreign Application Priority Data

Aug. 31, 2007   (JP) ................. 2007-226704

(51) Int. Cl.
*G06K 9/46*    (2006.01)
(52) U.S. Cl. ............ 382/234; 382/233; 382/239
(58) Field of Classification Search ........... 382/232–253
See application file for complete search history.

(56) References Cited

U.S. PATENT DOCUMENTS

| | | | |
|---|---|---|---|
| 5,008,951 A | 4/1991 | Koshi ................ | 382/56 |
| 5,862,140 A * | 1/1999 | Shen et al. .......... | 370/468 |
| 6,559,969 B1 * | 5/2003 | Lapstun .............. | 358/1.18 |
| 2002/0003845 A1 * | 1/2002 | Kamiya .............. | 375/340 |
| 2006/0028694 A1 * | 2/2006 | Soda ................. | 358/426.06 |
| 2007/0217704 A1 * | 9/2007 | Zeng et al. .......... | 382/244 |
| 2007/0253491 A1 * | 11/2007 | Ito et al. ........... | 375/240.24 |

FOREIGN PATENT DOCUMENTS

| | | |
|---|---|---|
| EP | 0 229 379 | 7/1987 |
| EP | 0 753 830 A2 | 1/1997 |
| JP | 02-237375 | 9/1990 |
| JP | 11-112818 A | 4/1999 |
| JP | 3083493 | 9/2000 |
| JP | 2001-211079 A | 8/2001 |
| JP | 2002-223360 | 8/2002 |

OTHER PUBLICATIONS

Japanese Office Action dated Oct. 17, 2011, in counterpart Japanese Application No. 2007-226704, and English-language translation thereof.
Horie, H., et al., "Facsimile Image High-Speed Coding and Decoding Processor", Electronics and Communications in Japan, Part 1—Communications, Wiley, Hoboken, NJ, vol. 77, No. 10, pp. 21-37, 1994.

* cited by examiner

*Primary Examiner* — Amir Alavi
*Assistant Examiner* — Kenny Cese
(74) *Attorney, Agent, or Firm* — Fitzpatrick, Cella, Harper & Scinto (57) ABSTRACT

An image decoding apparatus which decodes externally received encoded image information includes a storage unit which stores the image information. The image decoding apparatus includes a first decoding unit which receives, from the storage unit, image data to be decoded and reference data, and decodes the target image data. The image decoding apparatus includes a second decoding unit which receives the image data decoded by the first decoding unit, receives, from the storage unit, image data to be decoded based on the decoded image data, and decodes the image data received from the storage unit. The image decoding apparatus includes a decoding control unit which controls the first and second decoding units to repetitively execute decoding of image data in parallel.

7 Claims, 6 Drawing Sheets

IMAGE DECODING APPARATUS, IMAGE DECODING METHOD, AND PRINTING APPARATUS

BACKGROUND OF THE INVENTION

1. Field of the Invention

The present invention relates to an image decoding apparatus which decodes compression-encoded image information on the basis of encoded code information and reference pixel information, and an image decoding method therefor. More particularly, the present invention relates to an image decoding apparatus which can achieve a high-speed decoding process by suppressing data input/output to/from an external memory along with the decoding process, an image decoding method therefor, and a printing apparatus.

2. Description of the Related Art

These days, devices such as a personal computers (PC) and copying machines are very common. Image forming apparatuses such as an inkjet apparatus and electrophotographic apparatus for printing digital images have rapidly been developed and have become popular. Especially as devices attain more advanced functions, they handle color data more frequently. Along with this trend, image forming systems such as a color inkjet system and an color electrophotographic system have been developed.

An image forming system adopting the inkjet method will be exemplified.

Figure 4:
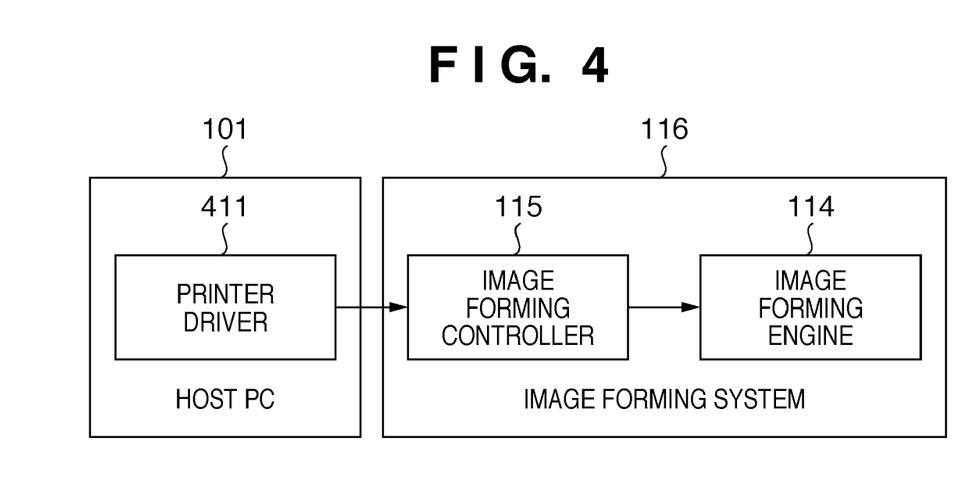
FIG. 4 is a schematic block diagram for explaining the basic configuration of an image forming system.

Such an image forming system often comprises an image forming controller and image forming engine. FIG. 4 shows an example of this image forming system. An image forming controller 115 in an image forming system 116 has an interface for exchanging image information and various kinds of control information with a printer driver 411 in a host PC 101. The image forming controller 115 generates image forming data based on input image information. An image forming engine 114 in the image forming system 116 conveys a print medium, drives a carriage, and controls the print head to form an image.

The image forming system comprises an image decoding apparatus which decompresses image information by decoding encoded code information. As an encoding method employed in the image forming system, there are proposed many encoding methods using the correlation with neighboring pixel values, like a run-length code or delta row code. The run-length code is used to encode the run length and pixel value when the same pixel value runs in the raster direction (horizontal direction). The delta row code is used to encode the run length when the same pixel value as that of an immediately preceding (upper) raster runs in the vertical direction.

These encoding methods utilize the fact that pixels having the same pixel value (close pixel values) are highly likely to run in the horizontal or vertical direction. A method of obtaining a high compression ratio by performing encoding using the correlation between the horizontal and vertical directions has also been developed (see, e.g., Japanese Patent Laid-Open No. 2002-223360). The encoding method disclosed in Japanese Patent Laid-Open No. 2002-223360 executes encoding by referring to left and upper pixels, and is particularly suited to an image forming system which processes a raster scan image. When upper, upper left, and upper right pixels are used as reference pixels, a decoding process for one raster requires pixels of one upper raster as reference pixels.

Figure 5:
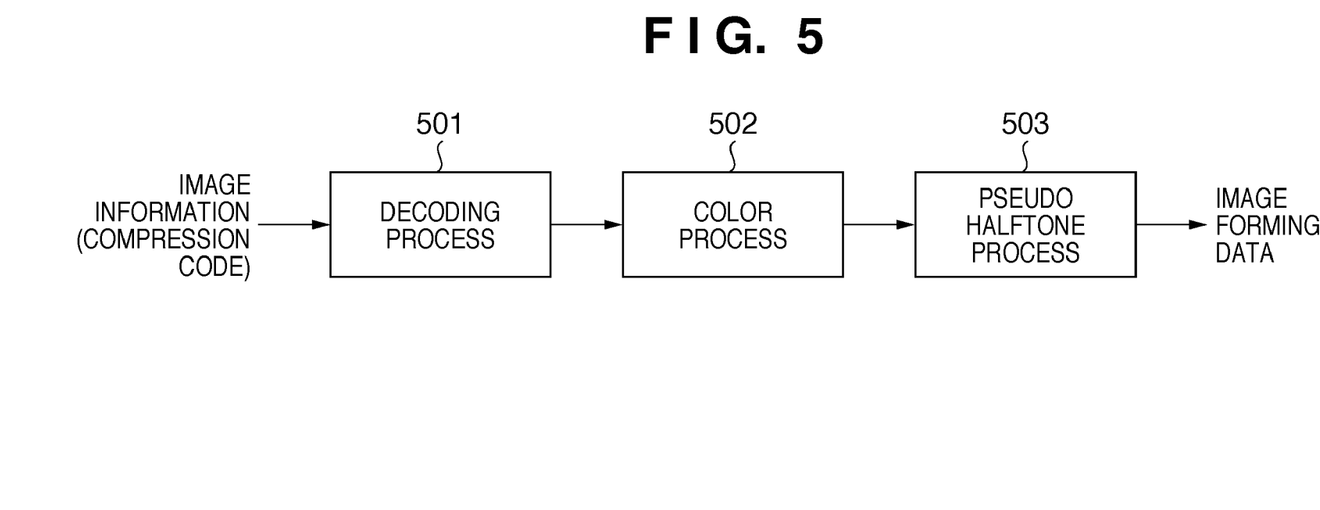
FIG. 5 is a block diagram for explaining the basic data flow of the image forming controller.

A data flow in the image forming controller will be explained with reference to FIG. 5.

The image forming controller receives compression-encoded code information from the host PC, and performs a decoding process 501 to decompress RGB multilevel image information. The image forming controller performs a color process 502 such as CSC or gamma correction to convert the RGB multilevel image information into multilevel data of ink colors (e.g., C, M, Y, and K). Further, the image forming controller performs a pseudo halftone process 503 using error diffusion or dithering to convert the multilevel data into binary data (image forming data) for each ink color. In this way, multilevel image data is converted into image forming data at a level (binary in this example) that can be output from the image forming engine (print head).

When image data processes such as the decoding process 501, the color process 502, and the pseudo halftone process 503 are executed in the system LSI chip serving as the core for controlling the entire system, the main memory connected outside the system LSI chip is desirably shared in terms of cost reduction.

However, when giving attention to the process of a given pixel in a decoding process for one raster that refers to pixels of one upper raster in order to perform decoding for one raster, the memory (reference raster memory) is accessed to read a reference pixel value for each color to be processed. For example, when processing three, R, G, and B colors, the reference raster memory needs to be accessed a total of three times. That is, for example, when the process is done at an operating frequency of 200 MHz in four cycles per pixel, a requested access speed is as high as (200 MHz/4 cycles)×3× 16 bits=300 Mbytes/S.

Many problems arise from access to the reference raster memory at a very high access speed in the decoding process. The first problem is the influence on the decoding process itself. The decoding process performance may not be fully exploited owing to access to the reference raster memory at a very high access speed. The second problem is the influence on the entire system. In a system in which the main memory is physically shared between a memory necessary for other data processes and system control, and the reference raster memory for the purpose of cost reduction, frequent access to the reference raster memory space may influence other data processes and system control.

To prevent these problems, there is proposed a configuration which adopts an on-chip buffer capable of storing a reference raster when a high-speed process is required, and suppresses access to the main memory to implement high performance (see, e.g., Japanese Patent No. 3083493).

Recently, functional integration has further proceeded upon requests for downsizing of the apparatus and cost reduction. Apparatuses in which a single system LSI chip implements main functions of an image forming controller are growing in number. More specifically, one system LSI chip performs network control between the apparatus and a host PC, printer language analysis, a decoding process, a color process, and a pseudo halftone process. Input/output of data associated with the generation of image forming data, which is typified by access to the reference raster memory to read a reference pixel value in a decoding process, uses a very large bandwidth. For this reason, a demand has arisen for building an optimal memory system of the system LSI chip in terms of high performance and cost reduction.

As described above, the configuration having an on-chip buffer capable of storing a reference raster can suppress the bandwidth consumption of the main memory. However, a large-format printer having a large printing width increases the chip size and cost. Assuming that R, G, and B each are made up of 16 bits when the on-chip buffer stores an upper reference raster in the decoding process, the necessary memory capacity is the number of pixels of one raster×48 bits. Processing high-resolution image information such as a text or line image requires an especially large memory capacity. For example, a memory capacity as large as 3.3 Mbits is necessary to cope with a resolution of 1,200 dpi and a maximum printing width of 60 inches.

SUMMARY OF THE INVENTION

The present invention has been made to mitigate the drawbacks of a conventional system, and provides an image decoding apparatus which can achieve both high-speed performance and cost reduction by efficiently suppressing readout of reference data from the main memory in the decoding process necessary in many lossless compression methods. The present invention aims to provide an image decoding method for the image decoding apparatus, and a printing apparatus.

According to a first aspect of the present invention, there is provided an image decoding apparatus for receiving encoded image information and decoding the encoded image information, comprising: a storage unit configured to store the image information; a first decoder configured to receive, from the storage unit, first image data to be decoded from the image information stored in the storage unit and neighboring image data for an image area near the first image data to be decoded, and operable to decode the first image data to be decoded based on the neighboring image data; a second decoder configured to receive the decoded image data decoded by the first decoder, and configured to receive, from the storage unit, further image data to be decoded based on the decoded image data, and configured to decode the further image data received from the storage unit on the basis of the decoded image data; and a decoding controller operable to control the first decoder and the second decoder to repetitively execute decoding of first image data by the first decoder and decoding of further image data by the second decoder in parallel.

In a preferred embodiment, the apparatus further comprises a buffer configured to store the decoded image data decoded by the first decoder, wherein the first decoder is configured to receive the image data to be decoded and the neighboring image data, and the second decoder is configured to receive the decoded image data from the buffer, and to receive, from the storage unit, further image data to be decoded based on the decoded image data.

In a preferred embodiment, the first decoder is configured to monitor an information amount stored in the buffer, and is operable to output the decoded image data to the buffer in accordance with the information amount.

In a preferred embodiment, the second decoder is configured to monitor an information amount stored in the buffer, and is configured to receive the decoded image data from the buffer in accordance with the information amount.

In a preferred embodiment, the first decoder and the second decoder monitor the information amount stored in the buffer, and the image decoding apparatus further comprises a controller operable to control input of the decoded image data to the buffer and output of the decoded image data from the buffer so as to preferentially output the image data decoded by the first decoder when the information amount is not less than a first threshold value, and preferentially input the image data decoded by the second decoder when the information amount is not more than a second threshold value smaller than the first threshold value.

According to the second aspect of the present invention, there is provided an image decoding method for an image decoding apparatus which receives encoded image information and decodes the encoded image information, comprising: storing the image information in a memory; a first decoding step of receiving, from the memory, first image data to be decoded from the image information stored in the memory, and neighboring image data for an image area near the image data to be decoded, and decoding the first image data to be decoded based on the neighboring image data; a second decoding step of receiving the decoded image data decoded in the first decoding step, and receiving, from the memory, further image data to be decoded based on the decoded image data, and decoding the further image data received from the memory on the basis of the decoded image data; and repetitively decoding first image data in the first decoding step and decoding further image data in the second decoding step in parallel.

According to the third aspect of the present invention, a printing apparatus is provided having an image decoding unit which externally receives image information from an external source and decodes the encoded image information. The image decoding unit comprises a storage unit configured to store the image information, a first decoder configured to receive, from the storage unit, first image data to be decoded from the image information stored in the storage unit and neighboring image data for an image area near the image data to be decoded, and operable to decode the first image data to be decoded based on the neighboring image data, a second decoder configured to receive the decoded image data decoded by the first decoder, to receive, from the storage unit, further image data to be decoded based on the decoded image data, and decoding the further image data received from the storage unit on the basis of the decoded image data, and a decoding controller operable to control the first decoder and the second decoder to repetitively execute decoding of first image data by the first decoder and decoding of further image data by the second decoder in parallel, The apparatus also comprises, a printing unit adapted to print image information decoded by the image decoding unit.

According to the fourth aspect of the present invention, there is provided a computer-readable storage medium storing a computer program which, when executed by a computer, causes the computer to carry out a method for externally receiving encoded image information and decoding the encoded image information. The method comprises: a storage step of storing the image information in a memory; a first decoding step of receiving, from the memory, image data to be decoded out of the image information stored in the memory and neighboring image data for an image area near the image data to be decoded, and decoding image data to be decoded based on neighboring image data; a second decoding step of receiving the decoded image data decoded in the first decoding step, and receiving, from the memory, image data to be decoded based on the decoded image data, and decoding the image data received from the memory on the basis of the decoded image data; and a control step of controlling to repetitively execute decoding of image data in the first decoding step and decoding of image data in the second decoding step in parallel.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An image forming system according to the embodiment employs an inkjet method. The inkjet image forming system according to the embodiment comprises a carriage which supports a print head and ink tank, a conveyance unit which conveys a print medium such as paper, and a control unit which controls these components.

The print head, which discharges ink droplets from a plurality of orifices, scans in a direction perpendicular to the print medium conveyance direction, and prints up to the end of a print medium. Then, the conveyance unit conveys the print medium by a predetermined distance (width). The print scanning and the conveyance of the print medium are repeated to form a print image.

The image forming system according to the embodiment comprises four print heads for black, cyan, magenta, and yellow inks, respectively. Each print head has a nozzle array in which 2,048 nozzles are arrayed at 1,200-dpi pitches. Each nozzle discharges a 4-pl ink droplet by one discharge operation Ink droplets of the four inks are superposed to form a color image.

As shown in FIG. 4, the image forming system according to the present embodiment comprises an image forming controller and image forming engine. An image forming controller 115 has an interface for exchanging image information and various kinds of control information with a host PC 101 and the like. The image forming controller 115 generates image forming data based on input image information. An image forming engine 114 conveys a print medium, drives the carriage, and controls the print head to form an image.

Figure 7:
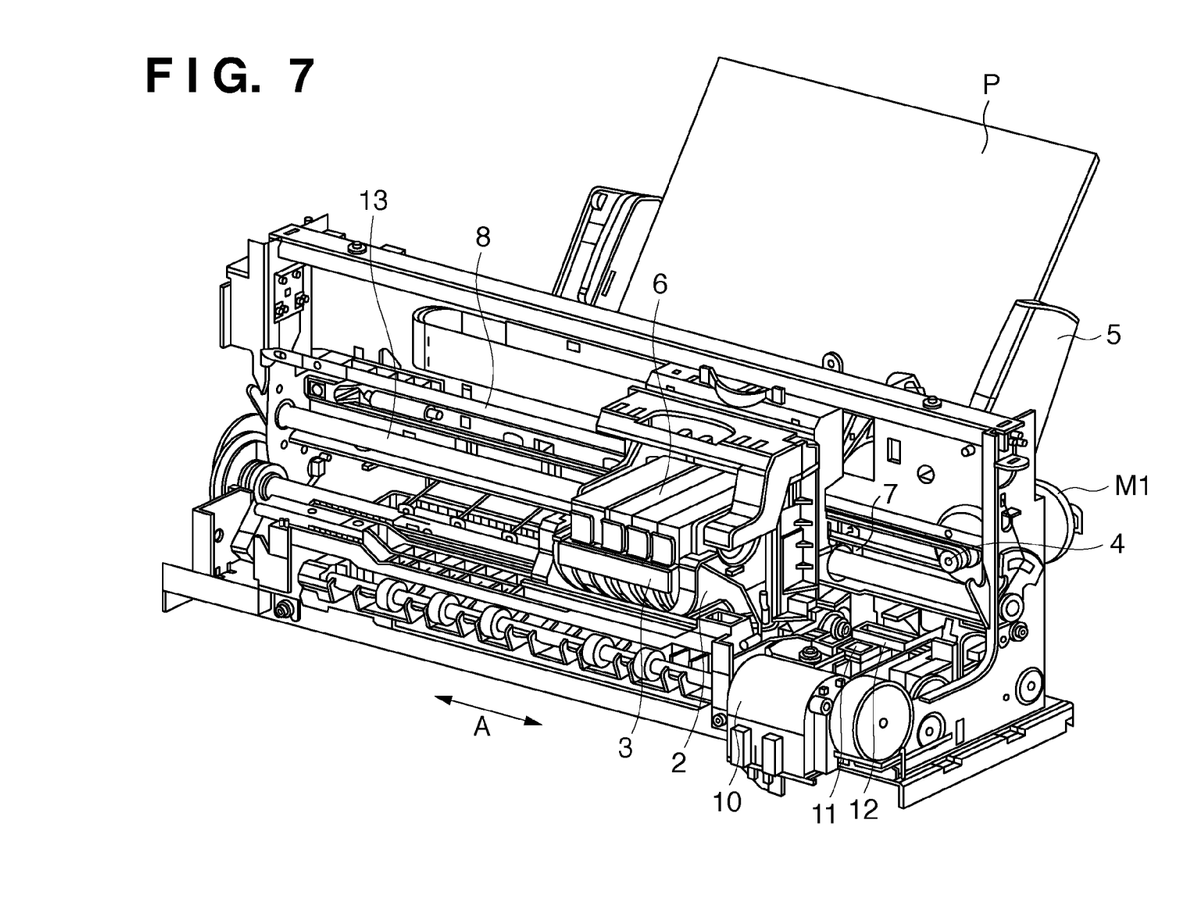
FIG. 7 is a schematic perspective view showing the outer appearance of the structure of an inkjet printing apparatus as one example of an image forming system according to a typical embodiment of the present invention.

FIG. 7 is a schematic perspective view showing the outer appearance of the structure of an inkjet printing apparatus as an image forming system according to a typical embodiment of the present invention.

As shown in FIG. 7, the inkjet printing apparatus (to be referred to as a printing apparatus hereinafter) comprises a print head 3 which prints by discharging ink according to the inkjet method. A transmission mechanism 4 transmits a driving force generated by a carriage motor M1 to a carriage 2 supporting the print head 3 to reciprocate the carriage 2 in the directions indicated by an arrow A as the main scanning direction (reciprocal scanning) Along with this reciprocal scanning, a print medium P such as print paper is fed via a paper feed mechanism 5 and conveyed to a print position. At the print position, the print head 3 prints by discharging ink to the print medium P.

The carriage 2 of the printing apparatus supports not only the print head 3, but also an ink tank 6 which contains ink to be supplied to the print head 3. The ink tank 6 is detachable from the carriage 2.

The printing apparatus shown in FIG. 7 can print in color. For this purpose, the carriage 2 supports four ink tanks which respectively contain magenta (M), cyan (C), yellow (Y), and black (K) inks. The four ink tanks are independently detachable.

The carriage 2 and print head 3 can achieve and maintain a predetermined electrical connection by properly bringing their contact surfaces into contact with each other. The print head 3 selectively discharges ink from a plurality of orifices and prints by applying energy in accordance with a printing signal. In particular, the print head 3 according to the embodiment adopts an inkjet method of discharging ink by using heat energy, and comprises an electrothermal transducer for generating heat energy. Electric energy applied to the electrothermal transducer is converted into heat energy. Ink is discharged from orifices by using a change in pressure upon growth and contraction of bubbles by film boiling generated by applying the heat energy to ink. The electrothermal transducer is arranged in correspondence with each orifice, and ink is discharged from a corresponding orifice by applying a pulse voltage to a corresponding electrothermal transducer in accordance with a printing signal.

As shown in FIG. 7, the carriage 2 is coupled to part of a driving belt 7 of the transmission mechanism 4 which transmits the driving force of the carriage motor M1. The carriage 2 is slidably guided and supported along a guide shaft 13 in the directions indicated by the arrow A. The carriage 2 reciprocates along the guide shaft 13 by normal rotation and reverse rotation of the carriage motor M1. A scale 8 representing the position of the carriage 2 is arranged along the main scanning direction (directions indicated by the arrow A) of the carriage 2.

The printing apparatus has a platen (not shown) facing the orifice surface of the print head 3 having orifices (not shown). The carriage 2 supporting the print head 3 reciprocates by the driving force of the carriage motor M1. At the same time, the print head 3 receives a printing signal to discharge ink and print by the entire width of the print medium P conveyed onto the platen.

In the printing apparatus, a recovery unit 10 for recovering the print head 3 from a discharge failure is arranged at a position outside the reciprocation range (outside the printing area) for the printing operation of the carriage 2 supporting the print head 3.

The recovery unit 10 comprises a capping mechanism 11 which caps the orifice surface of the print head 3, and a wiping mechanism 12 which cleans the orifice surface of the print head 3. The recovery unit 10 performs a discharge recovery operation. For example, the recovery unit 10 forcibly discharges ink from orifices by a suction unit (suction pump or the like) in the recovery unit in synchronism with capping of the orifice surface by the capping mechanism 11. Accordingly, the recovery unit 10 removes ink with high viscosity or bubbles from the ink channel of the print head 3.

In a non-printing operation or the like, the capping mechanism 11 caps the orifice surface of the print head 3 to protect the print head 3 and prevent evaporation and drying of ink. The wiping mechanism 12 is arranged near the capping mechanism 11, and wipes ink droplets attached to the orifice surface of the print head 3.

The printing apparatus can execute preliminary discharge by discharging ink irrelevant to printing to the capping mechanism 11.

The ink discharge state of the print head 3 can be kept normal by the suction operation and preliminary discharge operation using the capping mechanism 11, and the wiping operation using the wiping mechanism 12.

FIG. 7 shows a structure in which the ink tank 6 and print head 3 are divided, but the embodiment may also adopt a head cartridge which integrates the ink tank and print head.

Figure 1:
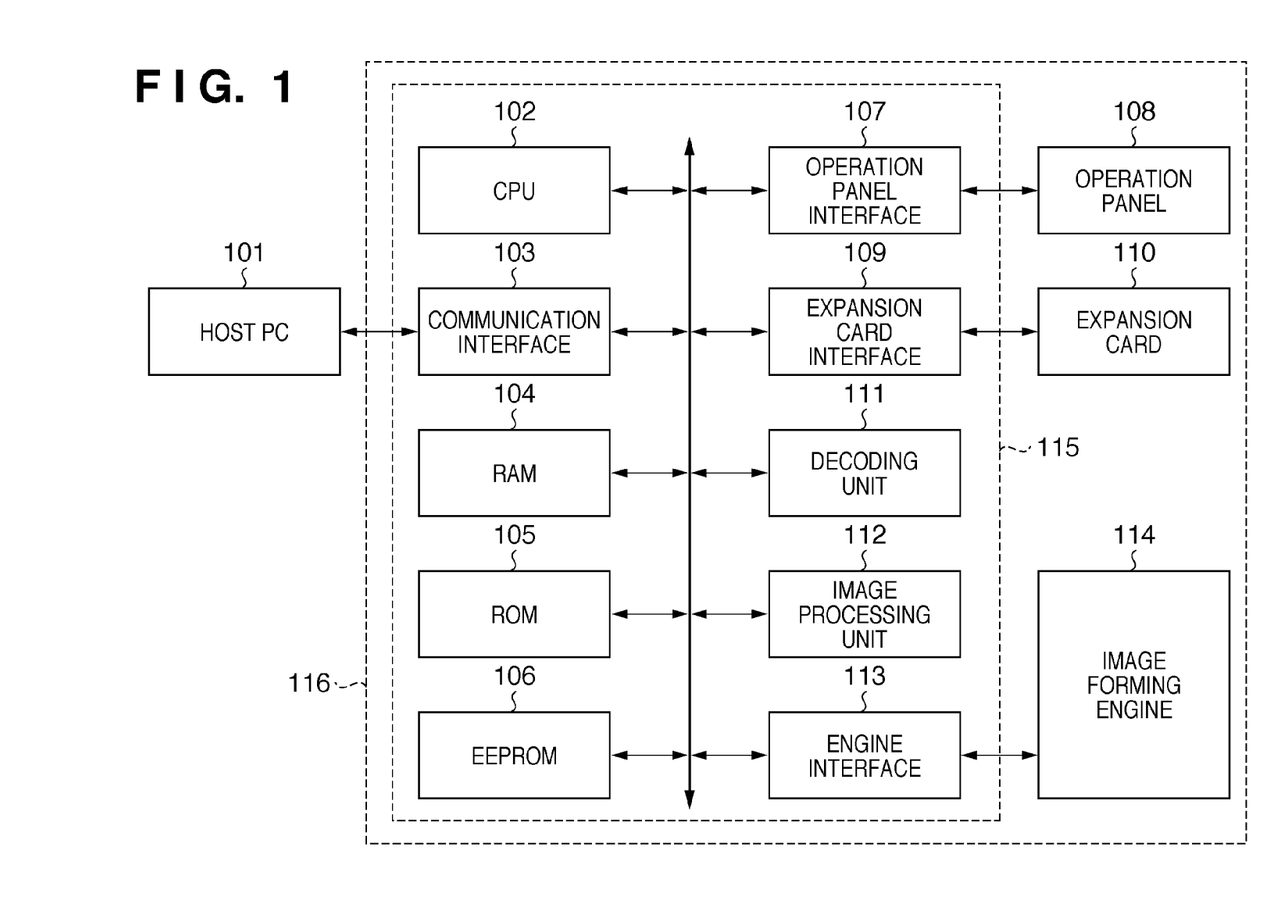
FIG. 1 is a schematic block diagram of an image forming controller applicable to the present invention.

FIG. 1 is a block diagram showing the schematic arrangement of the image forming controller. The image forming controller 115 is connected to the image forming engine 114 to build an image forming system 116.

A CPU 102 is connected to the host PC 101 via a communication interface 103. The CPU 102 accesses a ROM 105 which stores control programs, an EEPROM 106 which stores various constant data and the like, and a RAM 104 for storing command signals and image information received from the host PC 101. Based on pieces of information stored in these memories, the CPU 102 controls the printing operation and the like.

The RAM 104 can expand its memory capacity by using an expansion port. All of communication interface control, printer language analysis, a decoding process, a color process, a pseudo halftone process, external engine communication, and the like in the image forming controller are basically implemented by data flows via the RAM 104.

Instruction information input from keys of an operation panel 108 is transmitted to the CPU 102 via an operation panel interface 107. Similarly, instructions from the CPU 102 control the LED ON operation and LCD display of the operation panel 108 via the operation panel interface 107.

An expansion card interface 109 expands functions by connecting an expansion card 110 such as an HDD or image quality improving process accelerator.

An image decoding unit (decoding unit) 111 decompresses (decodes) image information on the basis of compression-encoded code information received from the host PC 101. Details of the decoding unit 111 will be described later.

An image processing unit 112 performs color conversion, color correction, and a pseudo halftone process for decoded image information, and generates image forming data for each ink that complies with the specifications of the image forming engine 114. The image processing unit 112 sends the image forming data to the image forming engine 114 via an engine interface 113.

Figure 2:
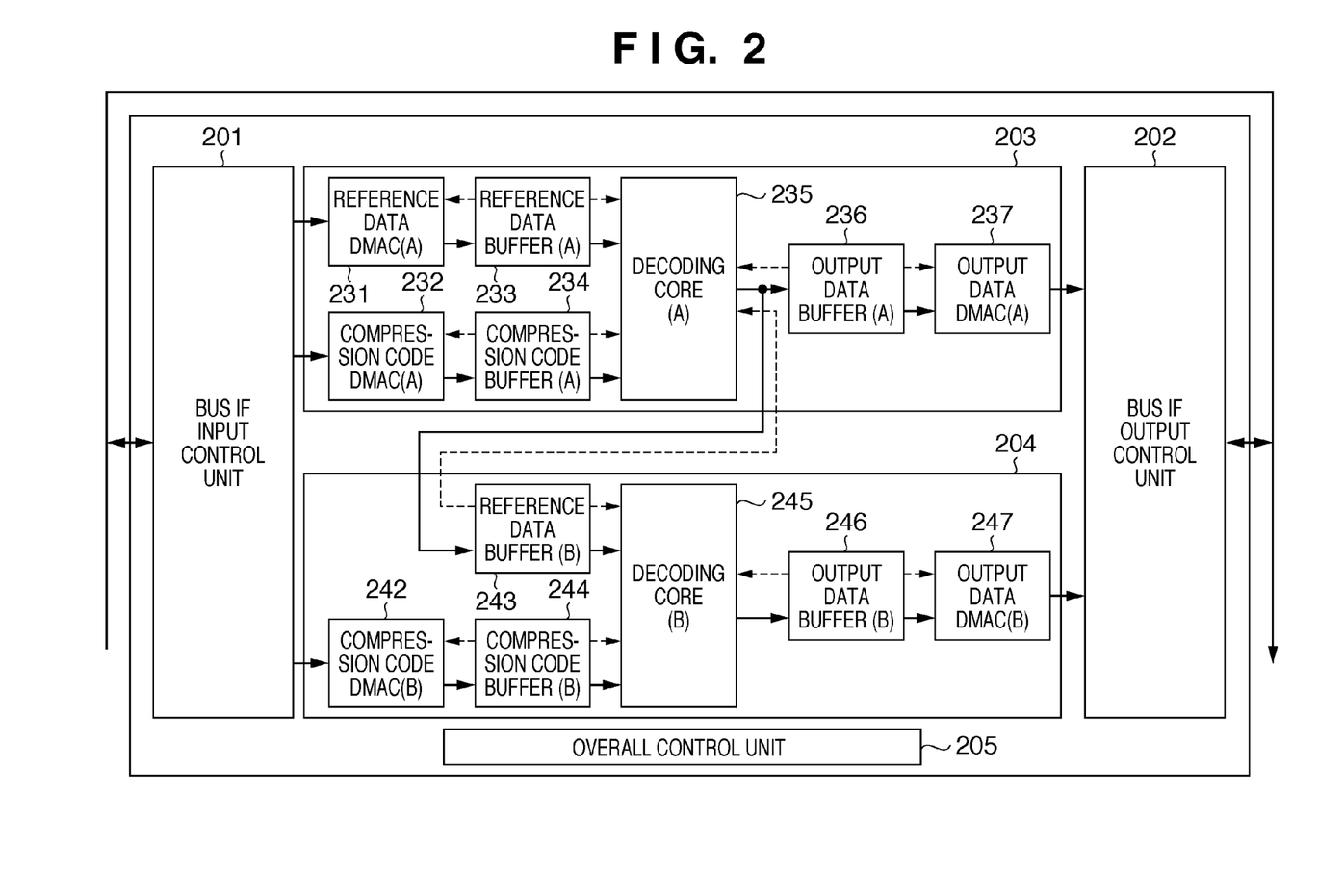
FIG. 2 is a schematic block diagram of a decoding unit according to the first embodiment of the present invention.

The decoding unit 111 will be explained with reference to FIG. 2 which is a schematic block diagram of the decoding unit 111.

A bus I/F input control unit 201 is connected to the RAM 104, and performs bus interface control associated with input transfer of a compression code and reference data. A bus I/F output control unit 202 is connected to the RAM 104, and performs bus interface control associated with output transfer of decompressed image data serving as a decoding result. A decoding A unit 203 and decoding B unit 204 execute in parallel decoding processes for two successive rasters. An overall control unit 205 monitors the state of each unit, and controls the overall decoding unit 111 in accordance with pieces of internal and external control information.

The bus I/F input control unit 201 receives an input transfer request issued from the decoding A unit 203 and an input transfer request issued from the decoding B unit 204, selectively responds by round robin scheduling, and performs a transfer process. Similarly, the bus I/F output control unit 202 receives an output transfer request issued from the decoding A unit 203 and an output transfer request issued from the decoding B unit 204, selectively responds by round robin scheduling, and performs a transfer process.

When transfer requests are simultaneously issued, the bus I/F input control unit 201 and bus I/F output control unit 202 execute arbitration control to respond to the requests in order. When transfer requests are not simultaneously issued, the bus I/F input control unit 201 and bus I/F output control unit 202 quickly respond to the requests and perform a transfer process.

The first embodiment will exemplify a delta row code for the compression method. As described above, the delta row code is used to encode the run length when the same value as that of an upper raster serving as an immediately preceding raster runs. Note that the present invention is not limited to delta row encoding, and is applicable to decoding processes according to many other compression methods of performing encoding using neighboring pixels such as a left, upper, and upper right pixels as reference pixels.

A reference data DMAC (A) 231 performs DMA (Direct Memory Access) transfer control associated with reference data input transfer of the decoding A unit. A compression code DMAC (A) 232 performs DMA transfer control associated with compression code input transfer of the decoding A unit. A reference data buffer (A) 233 is a small-capacity buffer which temporarily stores reference data of the decoding A unit and smoothes the input flow rate. A compression code buffer (A) 234 is a small-capacity buffer which temporarily stores the compression code of the decoding A unit and smoothes the input flow rate. A decoding core (A) 235 serving as the first decoding unit provides a decoding function in the decoding A unit. The decoding core (A) 235 performs a decoding process based on the compression code and reference data to output a decompressed image. In other words, the decoding core (A) 235 receives image data (compression code) to be decoded, and image data (reference data) near the image data to be decoded in an image formed based on image information stored in the RAM 104. The decoding core (A) 235 decodes the target image data on the basis of the reference data, and outputs the decoded image data. An output data buffer (A) 236 is a small-capacity buffer which temporarily stores decompressed image data of the decoding A unit and smoothes the output flow rate. An output data DMAC (A) 237 performs DMA transfer control associated with decompressed image data output transfer of the decoding A unit.

A compression code DMAC (B) 242 performs DMA transfer control associated with compression code input transfer of the decoding B unit. A reference data buffer (B) 243 is a small-capacity buffer which temporarily stores reference data of the decoding B unit and smoothes the input flow rate. A compression code buffer (B) 244 is a small-capacity buffer which temporarily stores the compression code of the decoding B unit and smoothes the input flow rate. A decoding core (B) 245 serving as the second decoding unit provides a decoding function in the decoding B unit. The decoding core (B) 245 performs a decoding process based on the compression code and reference data to output a decompressed image. In other words, the decoding core (B) 245 receives, as reference data, image data decoded by the decoding core (A) 235, and receives, from the RAM 104, image data (compression code) to be decoded based on the reference data out of image information stored in the RAM 104. The decoding core (B) 245 decodes the image data received from the RAM 104 on the basis of the reference data, and outputs the decoded image data. An output data buffer (B) 246 is a small-capacity buffer which temporarily stores decompressed image data of the decoding B unit and smoothes the output flow rate. An output data DMAC (B) 247 performs DMA transfer control associated with decompressed image data output transfer of the decoding B unit.

Parallel operations executed by coupling the decoding A unit 203 and decoding B unit 204, which are a feature of the present invention, will now be explained in detail.

As described above, the decoding A unit 203 and decoding B unit 204 execute in parallel decoding processes for two successive rasters #(N+1) and #(N+2). The decoding core (A) 235 receives a compression code and reference raster #N corresponding to the raster #(N+1) from the RAM 104 serving as an external memory. The decoding core (A) 235 outputs the decompressed raster #(N+1) to the RAM 104, and also supplies it as a reference raster #(N+1) to the decoding core (B) 245. The decoding core (A) 235 and decoding core (B) 245 are series-coupled, and a small-capacity buffer (the reference data buffer (B) 243) is interposed between them to temporarily store the reference raster #(N+1). In addition to the reference raster #(N+1), the decoding core (B) 245 receives a compression code corresponding to the raster #(N+2) from the RAM 104 serving as an external memory, and outputs the decompressed raster #(N+2) to the RAM 104.

The decoding core (A) 235 monitors the remaining buffer capacities (information amounts stored in buffers) of the reference data buffer (A) 233, compression code buffer (A) 234, and output data buffer (A) 236. The decoding core (A) 235 operates only when a necessary amount of reference data are prepared in the reference data buffer (A) 233 and a necessary amount of compression codes are prepared in the compression code buffer (A) 234. The operable condition of the decoding core (A) 235 is that a free area necessary to store output data is reserved in the output data buffer (A) 236.

Similarly, the decoding core (B) 245 monitors the remaining buffer capacities of the reference data buffer (B) 243, compression code buffer (B) 244, and output data buffer (B) 246. The decoding core (B) 245 operates only when a necessary amount of reference data are prepared in the reference data buffer (B) 243 and a necessary amount of compression codes are prepared in the compression code buffer (B) 244. The operable condition of the decoding core (B) 245 is that a free area necessary to store output data is reserved in the output data buffer (B) 246.

Various buffers are configured to satisfactorily smooth the flow rate per unit time in input transfer or output transfer. More specifically, each buffer takes a double buffer structure having a capacity double the unit of data transfer between the buffer and the RAM 104. For example, a buffer which assumes 4-beat transfer via a 64-bit data bus has a capacity of 64 bits×8=512 bits.

When storing an upper reference raster in the on-chip buffer in the decoding process, a memory capacity as large as 3.3 Mbits is necessary to cope with 16 bits for each of R, G, and B, a resolution of 1,200 dpi, and a maximum printing width of 60 inches. However, since the RAM 104 serving as an external memory is shared as a reference raster memory and the decoding unit having the above-described arrangement is employed, access to the RAM 104 serving as an reference raster memory can be reduced without arranging a large-capacity reference raster memory on the chip. More specifically, access to the RAM 104 when performing the decoding process for two successive rasters can be reduced (halved) to access to one raster. At the same time, a high-speed data process can be achieved by controlling decoding to repetitively execute decoding processes in parallel by the decoding core (A) 235 and decoding core (B) 245.

As described above, two decoding cores are series-coupled, and a decompressed image output from one decoding core is directly input as a reference image to the other decoding core. This arrangement can achieve both high-speed performance and cost reduction by effectively suppressing data input/output (requested band) to/from an external memory without arranging a reference data memory for each raster on the chip.

Second Embodiment

In the first embodiment, two decoding cores are coupled via a buffer, and operate in parallel in accordance with the remaining capacity of the coupling buffer. Input and output transfer requests to the two decoding cores are arbitrated by round robin scheduling.

The process speed in the decoding process greatly depends on the compression code string. Generally, a compression code can be divided into command and data parts. The interpretation of the command part can form a bottleneck in the decoding process, so if the interpretation of command parts frequently occurs, the process speed decreases.

The property of the compression code string microscopically depends on the characteristic of an entire image to be processed, but microscopically tends to vary. The variations sometimes appear as a relative speed difference between the two decoding cores in a short cycle. Since the two decoding cores are coupled via a buffer, their decoding processes proceed in parallel under restrictions. That is, a local speed decrease in one decoding core also influences the operation of the other decoding core.

The second embodiment will provide a method of performing arbitration control for input transfer and output transfer to/from two decoding cores in accordance with the remaining capacity of the buffer which couples the decoding A unit and decoding B unit.

The basic configuration of an image forming system according to the second embodiment is the same as that in the first embodiment (FIG. 4). The basic arrangement of an image forming controller is also the same as that in the first embodiment (FIG. 1).

Figure 3:
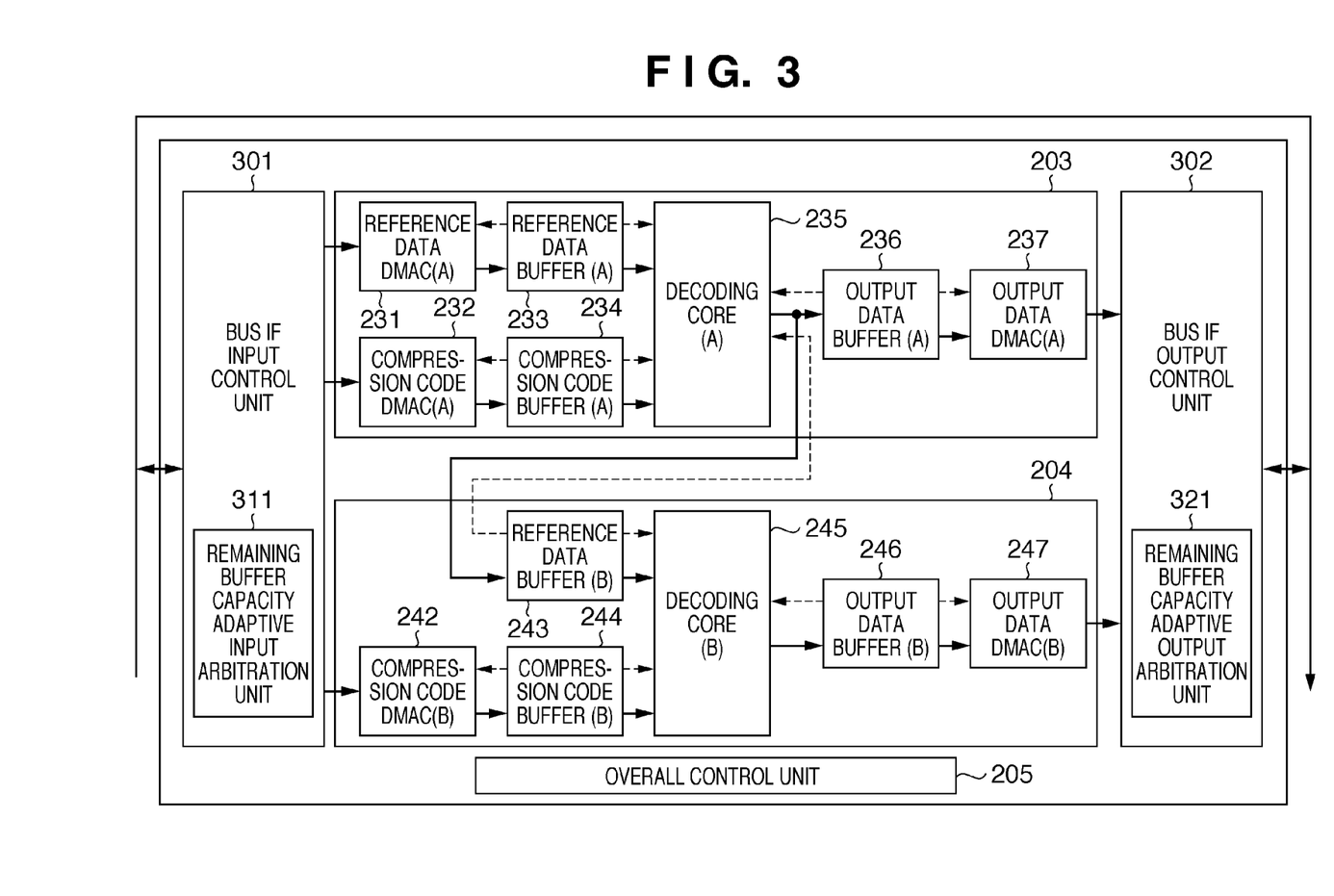
FIG. 3 is a schematic block diagram of a decoding unit according to the second embodiment of the present invention.

The coupling and parallel operations of two decoding cores which form a decoding unit 111, which are features of the present invention, will be explained in detail. FIG. 3 is a schematic block diagram of the arrangement of the decoding unit 111. The difference between the first and second embodiments will be mainly described.

As described above, the second embodiment executes input transfer and output transfer on the basis of priority control complying with the remaining capacity of a buffer which couples two decoding cores. The internal arrangements and basic operations of a decoding A unit 203 and decoding B unit 204 are the same as those in the first embodiment.

A bus I/F input control unit 301 has a remaining buffer capacity adaptive arbitration unit 311. The bus I/F input control unit 301 receives an input transfer request issued from the decoding A unit 203 and an input transfer request issued from the decoding B unit 204. The bus I/F input control unit 301 selectively responds via the remaining buffer capacity adaptive arbitration unit 311 in accordance with the remaining capacity of the reference data buffer (B) 243. Then, the bus I/F input control unit 301 executes a transfer process. Similarly, a bus I/F output control unit 302 comprises a remaining buffer capacity adaptive arbitration unit 321. The bus I/F output control unit 302 receives an output transfer request issued from the decoding A unit 203 and an output transfer request issued from the decoding B unit 204. The bus I/F output control unit 302 selectively responds via the remaining buffer capacity adaptive arbitration unit 321 in accordance with the remaining capacity of the reference data buffer (B) 243. Then, the bus I/F output control unit 302 executes a transfer process.

More specifically, arbitration control is done to respond preferentially to the decoding B unit when the remaining buffer capacity is equal to or larger than the first threshold for simultaneously issued transfer requests, and to the decoding A unit when the remaining buffer capacity is equal to or smaller than the second threshold. When the remaining buffer capacity is smaller than the first threshold and larger than the second threshold, round robin scheduling is executed. For requests issued not simultaneously, the bus I/F input control unit 301 and bus I/F output control unit 302 quickly respond and execute a transfer process.

If the pixel decompression process speeds of decoding core (A) 235 and decoding core (B) 245 differ from each other, the remaining capacity of the reference data buffer (B) 243 which couples them changes. That is, if the process relatively delays in the decoding core (A) 235, the remaining buffer capacity decreases to an empty state finally, and the decoding process of the decoding core (B) 245 stagnates. To the contrary, if the process relatively delays in the decoding core (B) 245, the remaining buffer capacity increases to a full state finally, and the decoding process of the decoding core (A) 235 stagnates.

When the decoding process of the decoding B unit 204 relatively delays and the remaining buffer capacity increases to be equal to or larger than the first threshold, input transfer and output transfer in the decoding B unit 204 are preferentially executed. When the decoding process of the decoding A unit 203 relatively delays and the remaining buffer capacity decreases to be equal to or smaller than the second threshold, input transfer and output transfer in the decoding B unit 204 are preferentially executed.

This arrangement can recover a decoding core suffering a relative process delay, and efficiently perform a high-speed data process by parallel decoding processes. Similar to the first embodiment, access to a RAM 104 when performing the decoding process for two successive rasters can be reduced (halved) to access to one raster.

As described in detail above, two decoding cores are series-coupled, and a decompressed image output from one decoding core is directly input as a reference image to the other decoding core. Further, data input/output transfer is controlled in accordance with the remaining capacity of the coupling buffer. This arrangement can achieve both high-speed performance and cost reduction by effectively suppressing data input/output (requested band) to/from an external memory without arranging a reference data memory for each raster on the chip.

Other Embodiments

As the decoding process, the above-described embodiments have exemplified a decoding process for delta row encoding which refers to one immediately preceding (upper) raster. The present invention is not limited to delta row encoding, and is also applicable to encoding which refers to a plurality of upper rasters, and encoding which refers to a process raster as well.

In the above example, the pixels of a scanned image in the horizontal direction (raster direction) are processed. However, the present invention is also applicable to a case where pixels are sequentially processed in the vertical direction (column direction). In this case, one immediately preceding column or a plurality of preceding columns are referred to in addition to a process column.

In the above-described embodiments, the image decoding apparatus is applied to an image forming system which adopts an inkjet method of representing an image by only two tone levels. However, the present invention does not depend on the image forming method. The present invention is also applicable to an inkjet method capable of representing several tone levels, or to another method such as an electrophotographic method.

In the above-described embodiments, the image forming controller is integrated with the image forming engine to constitute the image forming system. However, the present invention is also applicable to an image processing apparatus in which the image forming controller is arranged separately from the image forming engine. Moreover, the present invention is applicable to an image processing apparatus in which the image decoding apparatus in the image forming controller is arranged separately. The present invention is also applicable to a copying machine combined with a reading apparatus, or a facsimile apparatus having a communication function.

Figure 6:
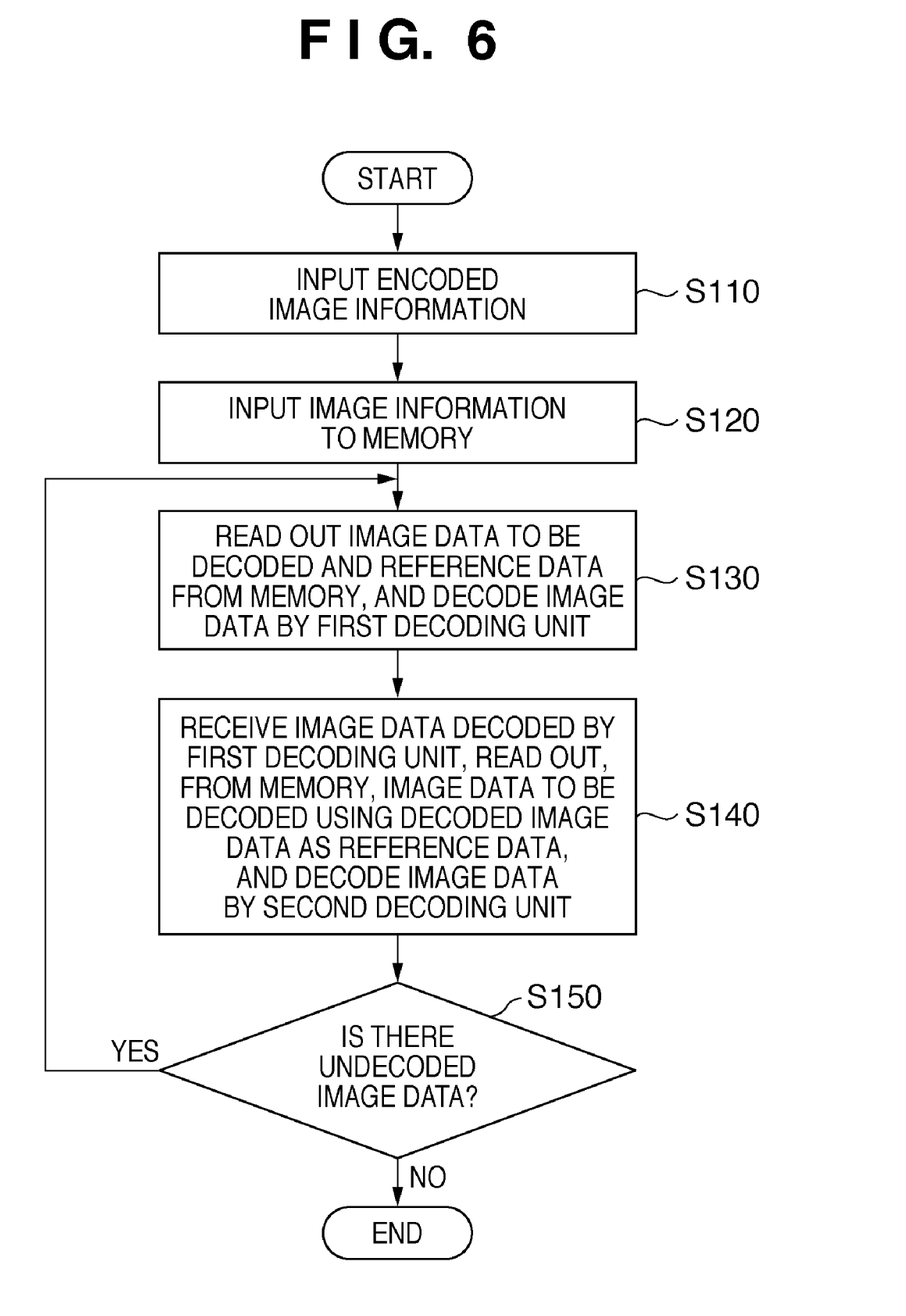
FIG. 6 is a flowchart showing an example of an image decoding method according to the present invention.

An example of an image decoding method for the image forming apparatus according to the present invention will be described with reference to the flowchart of FIG. 6.

In step S110, the image forming apparatus receives encoded image information from an external apparatus such as a PC. In step S120, the image information is stored in a memory such as the RAM 104. In step S130, image data to be decoded in the image information, and image data (reference data) near the image data to be decoded in an image formed based on the image information are read out from the memory. The first decoding unit decodes the target image data on the basis of the reference data. In step S140, the image data decoded by the first decoding unit is input from the first decoding unit, and image data to be decoded by referring to the image data decoded by the first decoding unit is read out from the memory. The second decoding unit decodes the image data read out from the memory on the basis of the image data decoded by the first decoding unit. Steps S130 and S140 are repeated in parallel until all image data are decoded out of the encoded image information. After that, the process ends (step S150).

A program for executing the respective steps of the image decoding method, and a storage medium storing the program also fall within the scope of the present invention.

The image decoding apparatus according to the present invention comprises two decoding cores for executing a decoding process. The two decoding cores are series-coupled to simultaneously execute decoding processes in parallel so as to directly supply a decompressed image output from one decoding core as a reference image input to the other decoding core. The image decoding apparatus according to the present invention can effectively reduce access to an external memory and process data at high speed without arranging a reference raster memory on the chip. As a result, the image decoding apparatus can achieve both high-speed performance and cost reduction.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-226704 filed on Aug. 31, 2007, which is hereby incorporated by reference herein in its entirety.

What is claimed is:

1. A decoding apparatus comprising:
    a storage unit configured to store encoded data;
    a first decoder configured to receive, from said storage unit, first encoded data to be decoded, configured to decode the first encoded data, and configured to output first decoded data to a first output portion and to a second output portion;
    a second decoder configured to receive the first decoded data decoded by said first decoder via the second output portion and to store the received first decoded data to a reference data buffer, configured to receive, from said storage unit, second encoded data to be decoded, and configured to decode the second encoded data received from said storage unit based on the first decoded data stored in the reference data buffer and configured to output second decoded data to a third output portion; and
    an output controller configured to be connected to the first output portion and the third output portion, configured to receive the first decoded data via the first output portion from said first decoder and the second decoded data via the third output portion from said second decoder, and configured to output the first decoded data received via the first output portion from said first decoder and the second decoded data received via the third output portion from said second decoder,
    wherein said output controller preferentially causes said first decoder to output the first decoded data if a remaining buffer capacity of the reference data buffer is not less than a first threshold value and preferentially causes said second decoder to output the second decoded data if the remaining buffer capacity of the reference data buffer is not more than a second threshold value smaller than the first threshold value, and
    wherein said output controller executes round robin scheduling for said first decoder and said second decoder if the remaining buffer capacity of the reference data buffer is smaller than the first threshold value and larger than the second threshold value.

2. The apparatus according to claim 1, wherein said first decoder outputs the first decoded data to a first output buffer via the first output portion, and wherein said first decoder decodes the first encoded data if a free area necessary to store the first decoded data is reserved in the first output buffer.

3. The apparatus according to claim 1, wherein said second decoder outputs the second decoded data to a second output buffer via the third output portion, and wherein said second decoder decodes the second encoded data if a free area necessary to store the second decoded data is reserved in the second output buffer.

4. The apparatus according to claim 1, wherein the first encoded data and the second encoded data is encoded according to a delta row code.

5. A decoding method comprising:
    storing encoded data a memory;
    a first decoding step, using a first decoder, of receiving, from the memory, first encoded data to be decoded, decoding the first encoded data, and outputting first decoded data to a second decoder and an output controller;
    a second decoding step, using the second decoder, of receiving the first decoded data decoded in the first decoding step and storing the received first decoded data to a reference data buffer, and receiving, from the memory, second encoded data to be decoded based on the first decoded data decoded in the first decoding step, and decoding the second encoded data received from the memory based on the first decoded data stored in the reference data buffer and outputting second decoded data to the output controller; and
    an output controlling step, using the output controller, receiving and outputting the first decoded data decoded in the first decoding step and the second decoded data decoded in the second decoding step, wherein said output controller preferentially causes said first decoder to output the first decoded data if a remaining buffer capacity of the reference data buffer is not less than a first threshold value and preferentially causes said second decoder to output the second decoded data if the remaining buffer capacity of the reference data buffer is not more than a second threshold value smaller than the first threshold value, and wherein said output controller executes round robin scheduling for said first decoder and said second decoder if the remaining buffer capacity of the reference data buffer is smaller than the first threshold value and larger than the second threshold value.

6. A printing apparatus having a decoding unit, comprising:

a memory configured to store encoded data;

wherein the decoding unit comprises a first decoder configured to receive, from said memory, first encoded data to be decoded, configured to decode the first encoded data, and configured to output first decoded data to a first output portion and to a second output portion, a second decoder configured to receive the first decoded data decoded by said first decoder via the second output portion and to store the received first decoded data to a reference data buffer, configured to receive, from said memory, second encoded data to be decoded, and configured to decode the second encoded data received from said memory based on the first decoded data stored in the reference data buffer and configured to output second decoded data to a third output portion, and an output controller configured to be connected to the first output portion and the third output portion, configured to receive the first decoded data via the first output portion from said first decoder and the second decoded data via the third output portion from said second decoder and configured to output the first decoded data received via the first output portion from said first decoder and the second decoded data received via the third output portion from said second decoder, wherein said output controller preferentially causes said first decoder to output the first decoded data if a remaining buffer capacity of the reference data buffer is not less than a first threshold value and preferentially causes said second decoder to output the second decoded data if the remaining buffer capacity of the reference data buffer is not more than a second threshold value smaller than the first threshold value, and wherein said output controller executes round robin scheduling for said first decoder and said second decoder if the remaining buffer capacity of the reference data buffer is smaller than the first threshold value and larger than the second threshold value; and a printing unit constructed to print image information based on the first and second decoded data output from said output controller.

7. A non-transitory computer-readable storage medium storing a computer program which, when executed by a computer, causes the computer to carry out a method for decoding encoded data, comprising:

a storage step of storing the encoded data in a memory;

a first decoding step, using a first decoder, of receiving, from the memory, first encoded data to be decoded, decoding the first encoded data, and outputting first decoded data to a second decoder and an output controller;

a second decoding step, using the second decoder, of receiving the first decoded data decoded in the first decoding step and storing the received first decoded data in a reference data buffer, and receiving, from the memory, second encoded data to be decoded based on the first decoded data stored in the reference data buffer. and decoding the second encoded data received from the memory based on the first decoded data stored in the reference data buffer and outputting second decoded data to the output controller; and an output controlling step, using the output controller, receiving and outputting the first decoded data decoded in the first decoding step and the second decoded data decoded in the second decoding step, wherein said output controller preferentially causes said first decoder to output the first decoded data if a remaining buffer capacity of the reference data buffer is not less than a first threshold value and preferentially causes said second decoder to output the second decoded data if the remaining buffer capacity of the reference data buffer is not more than a second threshold value smaller than the first threshold value, and wherein said output controller executes round robin scheduling for said first decoder and said second decoder if the remaining buffer capacity of the reference data buffer is smaller than the first threshold value and larger than the second threshold value.

* * * * *